United States Patent [19]
Huang et al.

[11] Patent Number: 5,936,808
[45] Date of Patent: Aug. 10, 1999

[54] DISK DRIVE ROTARY ACTUATOR HAVING ARM WITH CROSS-MEMBER CONTAINING ELASTOMERIC DAMPING MEMBER

[75] Inventors: Fu-Ying Huang; Francis Chee-Shuen Lee; Tzong-Shii Pan, all of San Jose, Calif.

[73] Assignee: International Business Machines Corporation, Armonk, N.Y.

[21] Appl. No.: 08/976,796

[22] Filed: Nov. 24, 1997

[51] Int. Cl.$^6$ ....................................................... G11B 5/55
[52] U.S. Cl. ................................................................ 360/106
[58] Field of Search ...................................... 360/104–106

[56] References Cited

U.S. PATENT DOCUMENTS

| | | | |
|---|---|---|---|
| 4,408,238 | 10/1983 | Hearn | 360/104 |
| 4,819,094 | 4/1989 | Oberg | 360/104 |
| 4,843,503 | 6/1989 | Hazebrouck et al. | 360/106 |
| 4,933,792 | 6/1990 | Sleger et al. | 360/106 |
| 5,382,851 | 1/1995 | Loubier | 310/13 |
| 5,408,372 | 4/1995 | Karam | 360/104 |
| 5,491,598 | 2/1996 | Stricklin et al. | 360/106 |
| 5,572,387 | 11/1996 | Brooks | 360/104 |
| 5,771,135 | 6/1998 | Ruiz | 360/104 |
| 5,801,905 | 9/1998 | Schirle | 360/104 |

FOREIGN PATENT DOCUMENTS

| | | | |
|---|---|---|---|
| 56-134360 | 10/1981 | Japan | G11B 21/08 |
| 61-271673 | 12/1986 | Japan | G11B 21/02 |

*Primary Examiner*—A. J. Heinz
*Attorney, Agent, or Firm*—Thomas R. Berthold

[57] ABSTRACT

A magnetic recording disk drive uses a rotary actuator with an elastomeric damping member located on the actuator arm. The actuator head support arm has a pair of rails that extend from the actuator pivot to the distal end where the read/write heads are supported. A lateral cross-member extends between and interconnects the rails. The cross-member contains a recess, and elastomeric damping material is located in the recess. The recess is a cut completely through the cross-member so that the cross-member is formed as two stubs extending from respective rails with a gap between the stub ends. The damping material is located in the gap and damps vibration of the actuator arm.

11 Claims, 5 Drawing Sheets

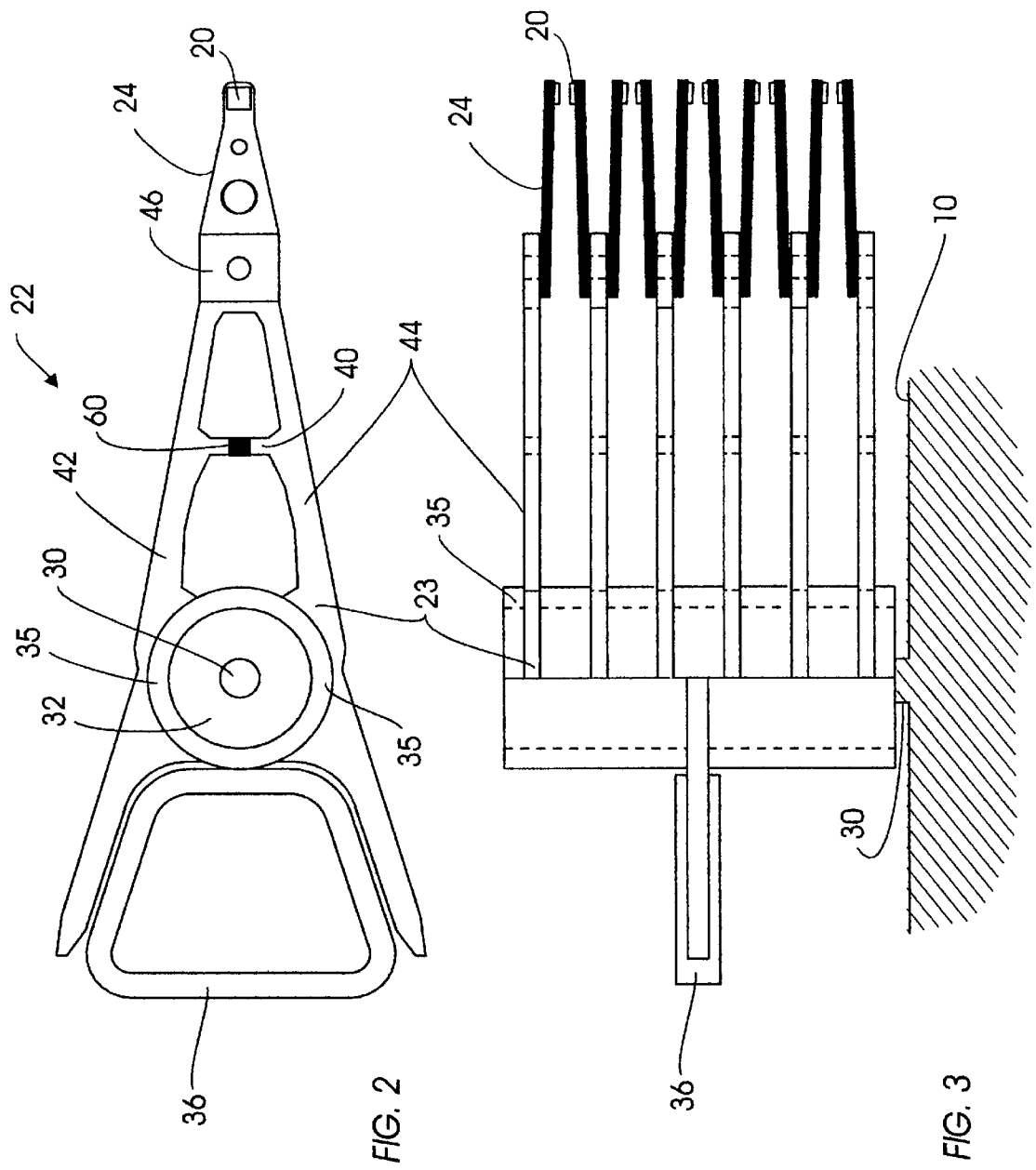

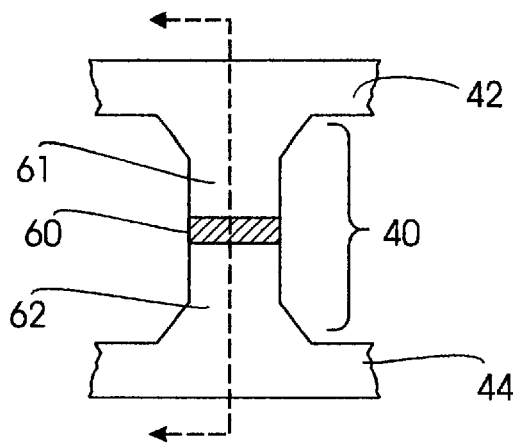
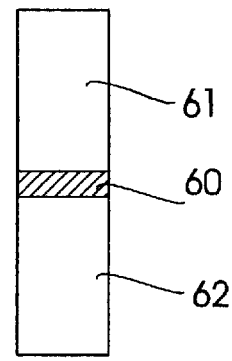
FIG. 4A
FIG. 4B
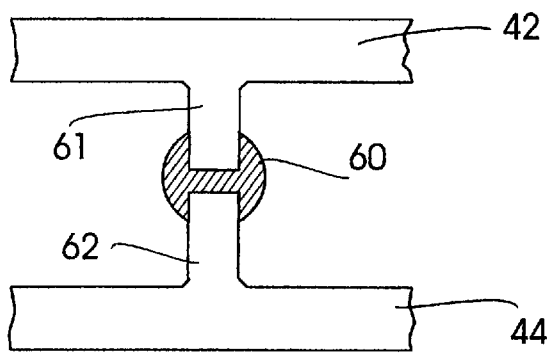
FIG. 5
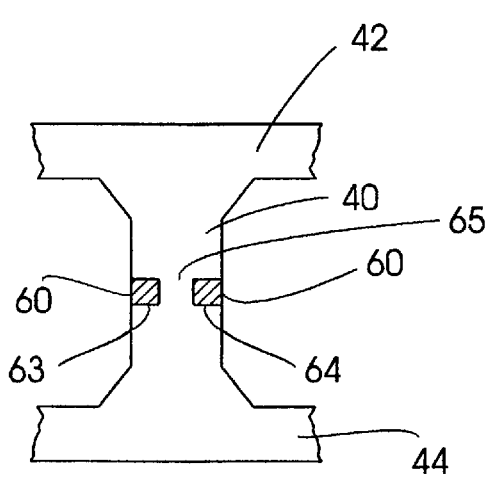
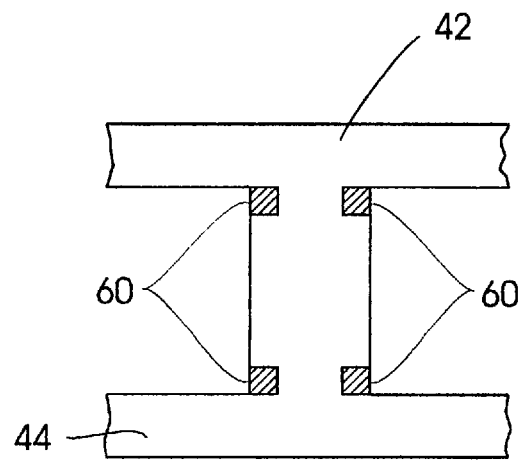
FIG. 6
FIG. 7

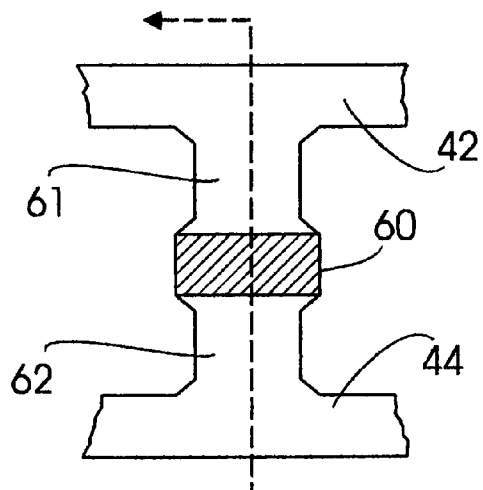
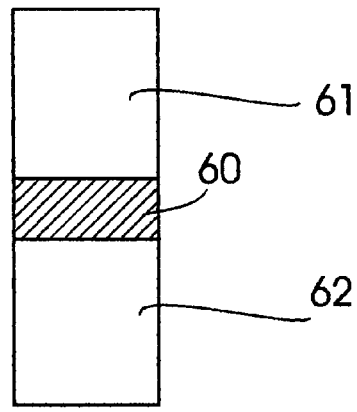
FIG. 8A        FIG. 8B
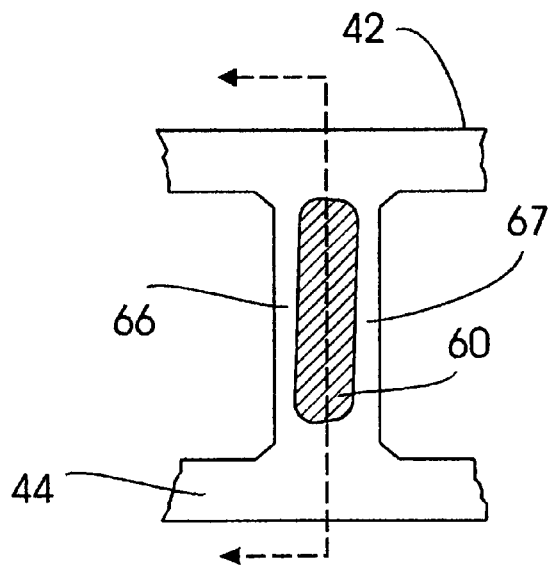
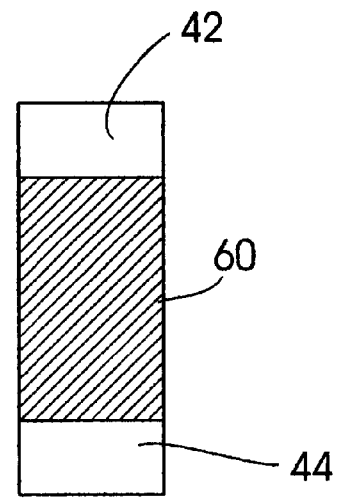
FIG. 9A        FIG. 9B

5,936,808

DISK DRIVE ROTARY ACTUATOR HAVING ARM WITH CROSS-MEMBER CONTAINING ELASTOMERIC DAMPING MEMBER

TECHNICAL FIELD

This invention relates in general to data recording disk drives, and more particularly to a magnetic recording rigid disk drive that uses a rotary actuator to move the read/write heads across the disk surfaces.

BACKGROUND OF THE INVENTION

Disk drives are information storage devices that use rotatable disks with concentric data tracks containing the information, read/write heads or transducers for reading and/or writing data onto the various tracks of the disks, and a rotary actuator connected to carriers for the heads for moving the heads to the desired tracks and maintaining them over the track centerlines during read or write operations. The rotary actuator is a voice coil motor (VCM) comprising a coil movable through a magnetic field generated by a fixed permanent magnet assembly. The current to the coil of the VCM actuator is controlled by a servo control system that uses head-positioning information read from the disks. There are typically a plurality of disks separated by spacer rings and stacked on a hub that is rotated by a disk drive motor, also called a spindle motor. A housing supports the spindle motor and actuator, and surrounds the head and disks to provide a substantially sealed environment for the head-disk interfaces.

In conventional magnetic recording disk drives, the head carrier is an air-bearing slider that rides on a bearing of air above the disk surface when the disk is rotating at its operational speed. The slider is maintained next to the disk surface by a suspension that connects the slider to the actuator. The slider is either biased toward the disk surface by a small spring force from the suspension, or is "self-loaded" to the disk surface by means of a "negative-pressure" air-bearing surface on the slider. In contrast to conventional air-bearing disk drives, contact or near-contact disk drives have been proposed that place the head carrier in constant or occasional contact with the disk or a liquid film on the disk during read and write operations.

One of the problems in rotary actuator disk drives is actuator vibration, typically caused by rapid motion of the actuator and air flow from the rapidly spinning disks. Actuator vibration causes instability in the servo control system and track misregistration, which limit the track density that can be achieved. The most troublesome vibration modes are the "butterfly" mode, wherein the coil and the actuator arm are stressed about the actuator pivot toward each other, and the arm modes, wherein the actuator arms sway in plane with different amplitudes and directions. All these modes involve relatively large sway motion of the actuator arm.

What is needed is a rotary actuator that has minimal vibration, especially at the butterfly mode and the arm modes, so that high track density can be achieved.

SUMMARY OF THE INVENTION

The invention is a data recording disk drive that uses a rotary actuator with an elastomeric damping member located on the actuator arm. The actuator arm has a pair of rails that extend from the actuator pivot to the distal end where the read/write heads are supported via a thin flexible suspension. A lateral cross-member extends between and interconnects the rails. The cross-member contains a recess, and elastomeric damping material is located in the recess. In the preferred embodiment, the recess is a cut completely through the cross-member so that the cross-member is formed as two stubs extending from respective rails with a gap between the stub ends. The damping material is located in the gap and damps vibration of the actuator arm.

For a fuller understanding of the nature and advantages of the present invention, reference should be made to the following detailed description taken together with the accompanying drawing.

BRIEF DESCRIPTION OF THE DRAWING

FIG. 2 is a top view of the actuator arm assembly shown in FIG. 1.

FIG. 3 is a side view of the actuator arm assembly of FIG. 2 illustrating multiple actuator arms with attached suspensions and heads.

FIG 4A is an enlarged view of a portion of the actuator arm showing a cross-member with two stubs and an interconnected damping member.

FIG. 4B is a sectional view through the dashed line of FIG. 4A.

FIG. 5 shows a modification to the embodiment depicted in FIGS. 4A and 4B wherein the damping member covers the outside of the cross-member.

FIG. 6 shows a first alternative embodiment wherein the recess in the cross-member comprises two cutouts.

FIG. 7 shows a second alternative embodiment wherein the recess in the cross-member comprises a plurality of cutouts at the corners where the cross-member is attached to the two actuator arm rails.

FIG. 8A shows an embodiment wherein the cross-member stubs have narrowed portions between their stub ends and their attachment to their respective rails.

FIG. 8B is a sectional view through the dashed line of FIG. 8A.

FIG. 9A shows an embodiment wherein the cross-member comprises two generally parallel ribs with a recess formed as the spacing between the two cross-ribs.

FIG. 9B is a sectional view through the dashed line of FIG. 9A.

DESCRIPTION OF THE PREFERRED EMBODIMENTS

Figure 1:
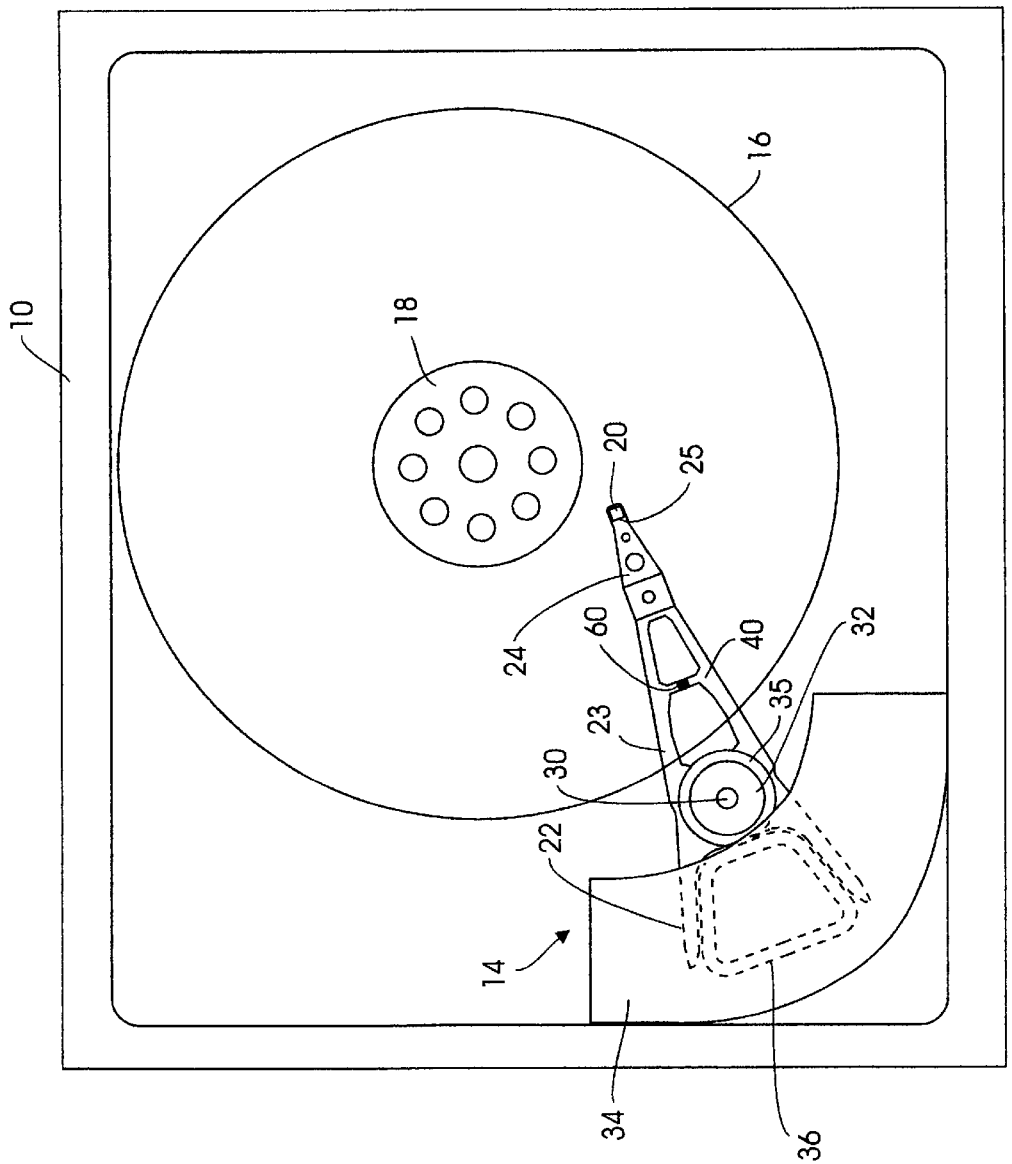
FIG. 1 is a sectional schematic view of a disk drive incorporating the present invention.

Referring to FIG. 1, there is illustrated a top view schematic of a disk drive incorporating the present invention. For ease of illustration and explanation, the disk drive depicted in FIG. 1 is shown as having a single recording head and associated disk surface, although conventional disk drives typically have multiple heads and disks. The disk drive comprises a magnetic recording disk 16, a housing or base 10 to which are secured a disk drive spindle or hub 18 that is attached to a disk drive motor that rotates the disk 16, a rotary voice coil motor (VCM) actuator 14, and a cover (not shown). The base 10 and cover provide a substantially sealed housing for the disk drive.

The rotary actuator 14 includes an actuator arm assembly 22, a fixed shaft 30 mounted to base 10, a bearing assembly 32 connecting the arm assembly 22 to the shaft 30, and a fixed magnet assembly 34 mounted to base 10. The actuator arm assembly 22 includes a central arm block 35 connected to bearing assembly 32, a head support arm 23 that extends from one end of the arm block 35, and a coil 36 attached to the other end of arm block 35. During operation of the disk drive, electrical current is applied to the coil 36 to cause interaction of the electrical field generated by the coil current with the magnetic field from the fixed magnet assembly 34. This causes the coil 36 to move, thereby causing the actuator arm assembly 22 to pivot about shaft 30 and the distal end of arm 23 to move across the disk 16. As shown in FIG. 1, the arm 23 has a cross-member 40 that has a recess along its length, and a viscous damping member 60 formed of elastomeric material is located in the recess for the purpose of damping the arm 23 during high-speed pivoting of the arm assembly 22.

A suspension 24 is attached to the distal end of head support arm 23 and an air-bearing slider 20 is attached to the end of suspension 24. A read/write head or transducer 25 is formed on the trailing end of the air-bearing slider 20. Transducer 25 may be an inductive read and write transducer or an inductive write transducer with a magnetoresistive (MR) read transducer formed by thin film deposition techniques as is known in the art. The suspension 24 provides a biasing force that urges the slider 20 onto the surface of the recording disk 16. The suspension 24 may be a conventional type of suspension, such as the well-known Watrous suspension, as described in U.S. Pat. No. 4,167,765 assigned to IBM. This type of suspension also provides a gimbaled attachment of the slider 20, which allows the slider to pitch and roll as it rides on the air bearing above the surface of disk 16 as the disk rotates. The arm 23, suspension 24, and slider 20 with transducer 25 are referred to as the head-arm assembly.

FIG. 2 is a top view of the actuator arm assembly 22, and FIG. 3 is a side view of the actuator arm assembly illustrating multiple actuator arms with attached suspensions and heads. The head support arm 23, which is attached to the arm block 35, has a pair of rails 42, 44 that extend from the arm block 35 to the distal end of arm 23. The distal ends of rails 42, 44 are connected to a suspension mount plate 46. The mount plate 46 provides the means for attachment of the flexible suspension 24 to the relatively rigid arm 23. Along the radial length of arm 23 a cross-member 40 interconnects rails 42, 44. In the preferred embodiment of the present invention as shown in FIG. 2, the cross-member is cut along its midlength and an elastomeric member 60 is located in the cut. The cut is completely through the cross-member 40 in the preferred embodiment, and the two stubs that comprise cross-member 40 are connected together by means of the elastomeric member 60. In the preferred embodiment, each of the arms 23 in the stack of arms shown in FIG. 3 contains an elastomeric member 60 located at the recess of the associated cross-member 40. However, it is within the scope of the present invention that one or more of the arms includes the elastomeric damping member located in the cross-member recess.

FIG. 4A is an enlarged view of that portion of arm 23 showing cross-member 40 with its two stubs 61, 62. FIG. 4B is a sectional view through the dashed line of FIG. 4A showing that the preferred recess in cross-member 40 is a cut completely through the cross-member so as to define two separate stubs 61, 62 which are connected together by means of the elastomeric member 60. Thus, the recess in cross-member 40 is essentially a gap between the two stubs 61, 62 into which the elastomeric damping material 60 is located.

FIG. 5 shows a modification to the embodiment depicted in FIGS. 4A and 4B. In this embodiment, the damping material 60 also covers the outside of the two stubs 61, 62, rather than being contiguous with the outer surfaces of the stubs, in order to provide additional support to reinforce the cross-member 40.

FIG. 6 shows a first alternative embodiment of the present invention wherein the recess in cross-member 40 comprises two cutouts 63, 64 that have been made in the cross-member to provide a narrow region 65 generally at the midpoint of the cross-member. The elastomeric damping material 60 is located in these two cutouts 63, 64.

FIG. 7 shows a second alternative embodiment of the present invention wherein the recess comprises a plurality of cutouts at the corners where the cross-member 40 is attached to the two rails 42, 44. In this embodiment, the cross-member 40 is wider at its midpoint than at its connection to the rails 42, 44.

In the embodiment of FIGS. 4A and 4B, the cross-member stubs 61, 62 are shown as having a constant thickness along their lengths between their connection to their respective rails and their stub ends. However, the stubs 61, 62 can have narrowed portions between their stub ends and their attachment to their respective rails 42, 44 in the manner as shown in FIGS. 8A and 8B, wherein FIG. 8B is a sectional view through the dashed line of FIG. 8A.

FIG. 9A and its sectional view of FIG. 9B illustrate a third alternative embodiment of the present invention. In this embodiment, the cross-member 40 comprises two generally parallel ribs 66, 67, and the recess is formed as the spacing between the two cross-ribs 66, 67. The elastomeric material 60 is located in this recess and provides contact between both the rails 42, 44 and the cross-ribs 66, 67.

Figure 10:
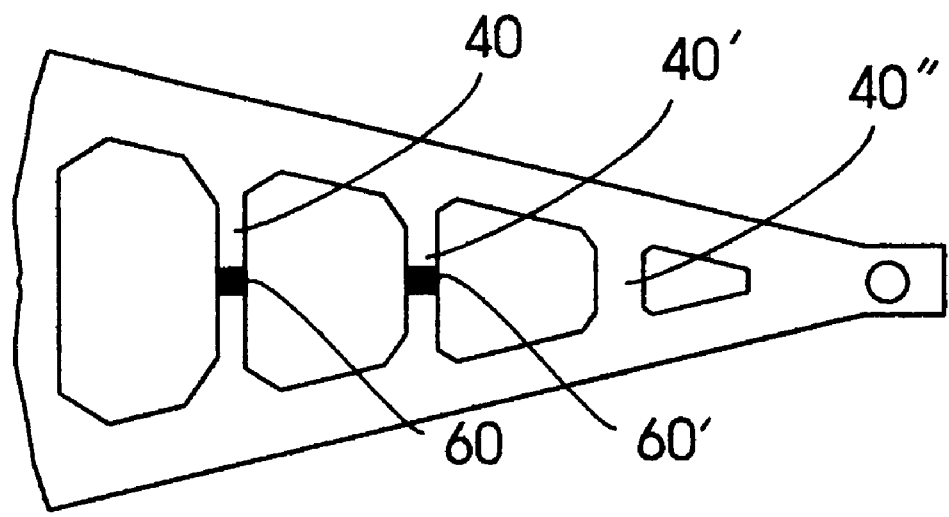
FIG. 10 shows an embodiment of an actuator arm with multiple cross-members wherein damping members are located in the recesses in two of three cross-members.

While the invention has been described in terms of a head support arm that has a single cross-member, it is within the scope of the present invention to provide damping material in one or more of the cross-members for those rotary actuators that have head support arms with multiple cross-members. Such a support arm for a head is shown in FIG. 10, wherein the arm has three generally transverse cross-members 40, 40', 40" interconnecting the two rails 42, 44. As shown in FIG. 10, cuts have been made through only two of the cross-members 40, 40', and elastomeric material 60, 60' has been inserted into the respective recesses of the cross-members 40, 40'.

In conventional disk drives, the actuator arm 23 is typically formed of aluminum. The preferred damping material for use in the present invention is DP112 available from 3M Corporation, or HTEI-FMC53 and HTEI-FMC70 available from High Tech Elastomers, Inc. In the preferred method for locating the damping material into the recess of the cross-member, the material is molded into the recess after the arm block with attached arm or arms has been extruded, but before machining occurs. In this manner, the elastomeric material also gets machined and forms a portion of the cross-member with contiguous outer surfaces.

The rotary actuator arm assembly 22 has as its first major bending mode the well-known "butterfly" mode, wherein the coil 36 on one end and the actuator head support arm 23 on the other end are stressed about the actuator pivot toward each other, e.g., the coil in the counterclockwise direction about the pivot and the arm in the clockwise direction about the pivot. A finite element calculation of the head support arm assembly shows that most of the strain energy is concentrated at the cross-member. A simulation of the butterfly mode and various arm modes for an actuator arm assembly where a cut has been placed through the cross-member show a large shearing motion at that location, which further indicates that if the cross-member is reconnected with damping material at the shearing location the arm will be effectively damped. Thus, the placement of the elastomeric damping material at a recess in the cross-member between the two rails of the head actuator support arm removes energy out of the arm and damps vibration during the butterfly mode and the arm modes.

While the preferred embodiments of the present invention have been illustrated in detail, it should be apparent that modifications and improvements may be made to the invention without departing from the spirit and scope of the invention as described in the following claims.

What is claimed is:

1. A head support arm for a rotary actuator in a data recording disk drive, the rotary actuator being rotatable about a pivot for moving the supported head across the disk, the head support arm comprising:

a pair of rails, each rail having a first end for connection to the pivot of the rotary actuator and a second end for supporting the head, the rails lying in substantially the same plane and being connected to each other at their respective first and second ends; and a cross-member extending generally transversely between and interconnecting the rails at a location between the first and second ends of the rails so as to lie in substantially the same plane as the rails, the cross-member comprising two stubs, each stub extending from a respective rail and terminating at a stub end with said stub ends spaced apart to define a gap, and an elastomeric member located in said gap and in contact with each of said stub ends.

2. The head support arm according to claim 1 wherein said gap is located substantially at the midpoint of the length of the cross-member.

3. The head support arm according to claim 1 wherein each stub has a width narrower than the width of its stub end.

4. The head support arm according to claim 1 further comprising a head suspension attached to the second end of the support arm.

5. The head support arm according to claim 4 further comprising a head attached to the suspension.

6. The head support arm according to claim 1 further comprising an actuator arm block, and wherein the first end of the support arm is attached to the arm block.

7. A disk drive rotary actuator comprising:

a base plate;

a magnet assembly mounted to the base plate;

an arm assembly mounted to the base plate, the arm assembly including an arm block rotatable about a pivot, a coil attached to the arm block for interaction with the magnet assembly, and a plurality of support arms attached to the arm block, each support arm comprising:

a pair of rails, each rail having a first end for connection to the pivot of the rotary actuator and a second end for supporting the head, the rails lying in substantially the same plane and being connected to each other at their respective first and second ends; and a cross-member extending generally transversely between and interconnecting the rails at a location between the first and second ends of the rails so as to lie in substantially the same plane as the rails, the cross-member comprising two stubs, each stub extending from a respective rail and terminating at a stub end with said stub ends spaced apart to define a gap, and an elastomeric member located in said gap and in contact with each of said stub ends.

8. The rotary actuator according to claim 7 wherein said gap is located substantially at the midpoint of the length of the cross-member.

9. The rotary actuator according to claim 7 wherein each stub has a width narrower than the width of its stub end.

10. The rotary actuator according to claim 7 further comprising a plurality of suspensions, each suspension being attached to the second end of a support arm.

11. The rotary actuator according to claim 10 further comprising a plurality of heads, each head being attached to a corresponding suspension.

* * * * *